United States Patent
Charleux et al.

(10) Patent No.: US 11,834,765 B2
(45) Date of Patent: Dec. 5, 2023

(54) WEAVING INSTALLATION ALLOWING THE NUMBER OF FILAMENTS IN A STRAND TO BE DETERMINED

(71) Applicant: SAFRAN AIRCRAFT ENGINES, Paris (FR)

(72) Inventors: François Charleux, Moissy-Cramayel (FR); Steven Gérard Joseph Bienvenu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 178 days.

(21) Appl. No.: 17/637,746

(22) PCT Filed: Aug. 20, 2020

(86) PCT No.: PCT/FR2020/051488
§ 371 (c)(1),
(2) Date: Feb. 23, 2022

(87) PCT Pub. No.: WO2021/038160
PCT Pub. Date: Mar. 4, 2021

(65) Prior Publication Data
US 2022/0282408 A1     Sep. 8, 2022

(30) Foreign Application Priority Data
Aug. 26, 2019   (FR) ...................................... 1909409

(51) Int. Cl.
*D03J 1/00*     (2006.01)
*D03J 3/00*     (2006.01)
(Continued)

(52) U.S. Cl.
CPC . *D03J 1/00* (2013.01); *D03J 3/00* (2013.01); *G01B 5/08* (2013.01)

(58) Field of Classification Search
CPC ...... D03J 1/00; D03J 3/00; G01B 5/08; G01B 11/08; G01B 11/00; D03D 25/005
See application file for complete search history.

(56) References Cited

U.S. PATENT DOCUMENTS

| | | | | |
|---|---|---|---|---|
| 2,295,795 A | * | 9/1942 | Keeler | B65H 63/028 377/6 |
| 2,565,500 A | * | 8/1951 | Ingham, Jr. | B65H 63/06 66/82 R |

(Continued)

FOREIGN PATENT DOCUMENTS

FR     1249226        12/1960
FR     2 684 460 A1    6/1993

OTHER PUBLICATIONS

English translation of Written Opinion dated Dec. 18, 2020, issued in corresponding International Application No. PCT/FR2020/051488, filed Aug. 20, 2020, 6 pages.

(Continued)

*Primary Examiner* — Robert H Muromoto, Jr.
(74) *Attorney, Agent, or Firm* — CHRISTENSEN O'CONNOR JOHNSON KINDNESS PLLC

(57) ABSTRACT

A weaving installation includes a loom that receives a series of strands, and at least one device for measuring the diameter of a strand having a defined number of filaments. The device includes a diaphragm having an external ring forming a support on which a series of strips forming an iris are fixed. The strips are movable and allow a substantially circular space with variable dimensions to be defined at the center of the iris. The diaphragm is configured to adjust the dimensions of the space so as to allow a strand of the loom to pass through it, and to encircle the profile of the strand so as to allow the number of filaments in the strand to be determined.

10 Claims, 2 Drawing Sheets

(51) Int. Cl.
*G01B 5/08* (2006.01)
*D03J 1/20* (2006.01)

(56) References Cited

U.S. PATENT DOCUMENTS

| | | | | |
|---|---|---|---|---|
| 3,303,698 A * | 2/1967 | Loepfe | ................. | B65H 63/062 |
| | | | | 73/160 |
| 4,007,457 A * | 2/1977 | Aeppli | ................. | B65H 63/062 |
| | | | | 340/677 |
| 4,046,536 A * | 9/1977 | Smithgall, Sr. | .......... | G05D 5/03 |
| | | | | 65/435 |
| 4,060,965 A * | 12/1977 | Schwartz | ............... | D01H 13/22 |
| | | | | 340/677 |
| 4,610,707 A * | 9/1986 | Grundy | .............. | G01N 21/8915 |
| | | | | 73/159 |
| 5,054,317 A * | 10/1991 | Laubscher | ............. | G01B 21/12 |
| | | | | 356/429 |

OTHER PUBLICATIONS

International Preliminary Report on Patentability dated Mar. 1, 2022, issued in corresponding International Application No. PCT/FR2020/051488, filed Aug. 20, 2020, 7 pages.
International Search Report dated Dec. 18, 2020, issued in corresponding International Application No. PCT/FR2020/051488, filed Aug. 20, 2020, 7 pages.
Written Opinion dated Dec. 18, 2020, issued in corresponding International Application No. PCT/FR2020/051488, filed Aug. 20, 2020, 6 pages.

\* cited by examiner

WEAVING INSTALLATION ALLOWING THE NUMBER OF FILAMENTS IN A STRAND TO BE DETERMINED

TECHNICAL FIELD OF THE INVENTION

The present invention relates to the field of the manufacturing a turbomachine member made of composite material with a fibrous reinforcement, in particular to the manufacture by weaving of this fibrous reinforcement. It is aimed in particular at a device allowing to determine the size or number of filaments of the strands used for weaving in a weaving installation.

BACKGROUND

The prior art is illustrated, for example, by the document FR-A1-1 249 226. Today, many parts designed and produced in the field of the aeronautical industry are made of composites and more particularly of composites with a 2D and/or 3D woven fibrous reinforcement. Such parts are for example vanes or casings or OGVs (Outlet Guide Vanes) of the turbomachines such as the LEAP or GE9X. These parts classically consist of a weaving of carbon (or glass) threads injected with resin (often epoxy). A thread, also referred to as strand, is a set of twisted filaments. Each strand consists of several thousand of carbon filaments. The carbon strands referred to here are the filamentary structures seen through the resin. It is referred to, for example, 3K, 12K, 24K strands which are composed respectively of three, twelve or twenty-four thousand filaments. A turbomachine part such as a vane is classically made of several sizes of strands and each of them has a specific place in the vane in order to give it an optimal mechanical strength. Thus, when weaving with a loom, strand reels are arranged on creels, each strand is unwound to its place in the loom. As several sizes of strands are used for the warps and the wefts, the difficulty is to arrange the reels containing a given size of thread in the corresponding creel.

Today, it is the operators who ensure the correct location of the reel with the right size of thread at the level of the machine. They control the size of the threads by counting the number of filaments that make up the thread.

This control being tedious, mistakes can be made. The measurement cannot be done with a caliper or a feeler gauge because the diameter of a strand cannot be measured with this type of tool: indeed, the filaments move and the section of the strand is not constant, which does not allow the measurement of the diameter of the strand. Finally, since this control is manual, no traceability can be done automatically.

A wrong strand size implies a modified mechanics which results in the issuance of a waiver and potentially the scrapping of the part. This results in a significant cost and delivery delays.

One of the objectives of the present applicant is therefore to enable an accurate, reliable, fast and inexpensive determination of the number of filaments in a strand.

SUMMARY OF THE INVENTION

This objective is achieved in accordance with the invention by means of a weaving installation comprising a loom intended to receive a series of strands, and at least one device for measuring the diameter of a strand comprising a defined number of filaments, the device comprising a diaphragm comprising an external ring forming a support on which are attached a series of strips forming an iris, the strips being movable and allowing defining, at the centre of the iris, a substantially circular space with variable dimensions. The at least one diaphragm is configured to adjust the dimensions of the space so as to allow a strand of the loom to pass through it, and to encircle the profile of the strand, so as to allow the number of filaments of said strand to be determined.

Thus, this solution allows achieving the above-mentioned objective. In particular, by adjusting the opening of the diaphragm to the outline of the strand and then measuring this opening, the number of filaments in the strand can be determined without removing it from the loom.

The installation according to the invention may comprise one or more of the following characteristics, taken alone or in combination with each other:
- the strips of the iris of the diaphragm occupy a first position in which the strips encircle the strand so as to compress the filaments between them in the space in the centre of the iris,
- the diaphragm is attached to the loom,
- the diaphragm is a camera diaphragm,
- the diaphragm comprises a control element,
- the control element is a scale allowing a measurement of a dimension to be taken,
- the control element is a microprocessor and the diaphragm comprises a motor connected to the microprocessor,
- the microprocessor is configured to determine the dimension corresponding to the dimensions of the space and to keep them in memory.

The invention also relates to a method for determining a number of filaments in a strand by means of an installation as described above, characterised in that it comprises the following steps:
- positioning the strand in the device,
- activating the device,
- determining the number of threads constituting said strand.

The method according to the invention may comprise one or more of the following characteristics, taken alone or in combination with each other:
- opening the measuring device so that the space has a larger diameter than that of the strand, after laying said strand on the loom,
- passing the strand through the space of the device,
- actuating the strips of the device to close the iris around the strand so as to clamp it between the strips and to adjust the dimensions of the space to the diameter of the strand,
- reading the dimension corresponding to the diameter of the measured strand,
- determining the number of filaments forming said strand.

Furthermore, the measuring device can be a diaphragm and the last three steps can be performed automatically.

BRIEF DESCRIPTION OF FIGURES

Further characteristics and advantages of the invention will become apparent from the following detailed description, for the understanding of which reference is made to the attached drawings in which.

DETAILED DESCRIPTION OF THE INVENTION

Figure 1:
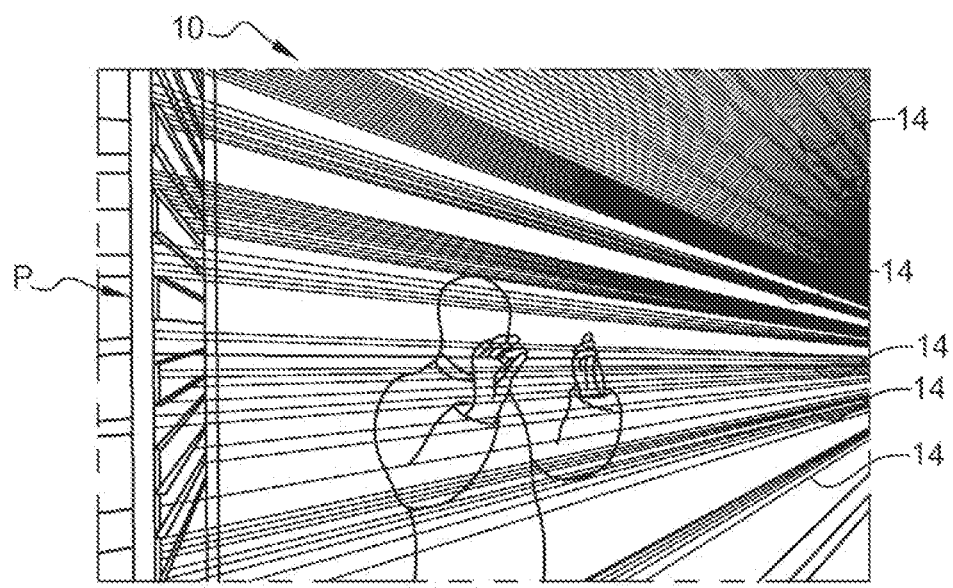
FIG. 1 shows the warp threads between the creel and the loom.
Figure 2:
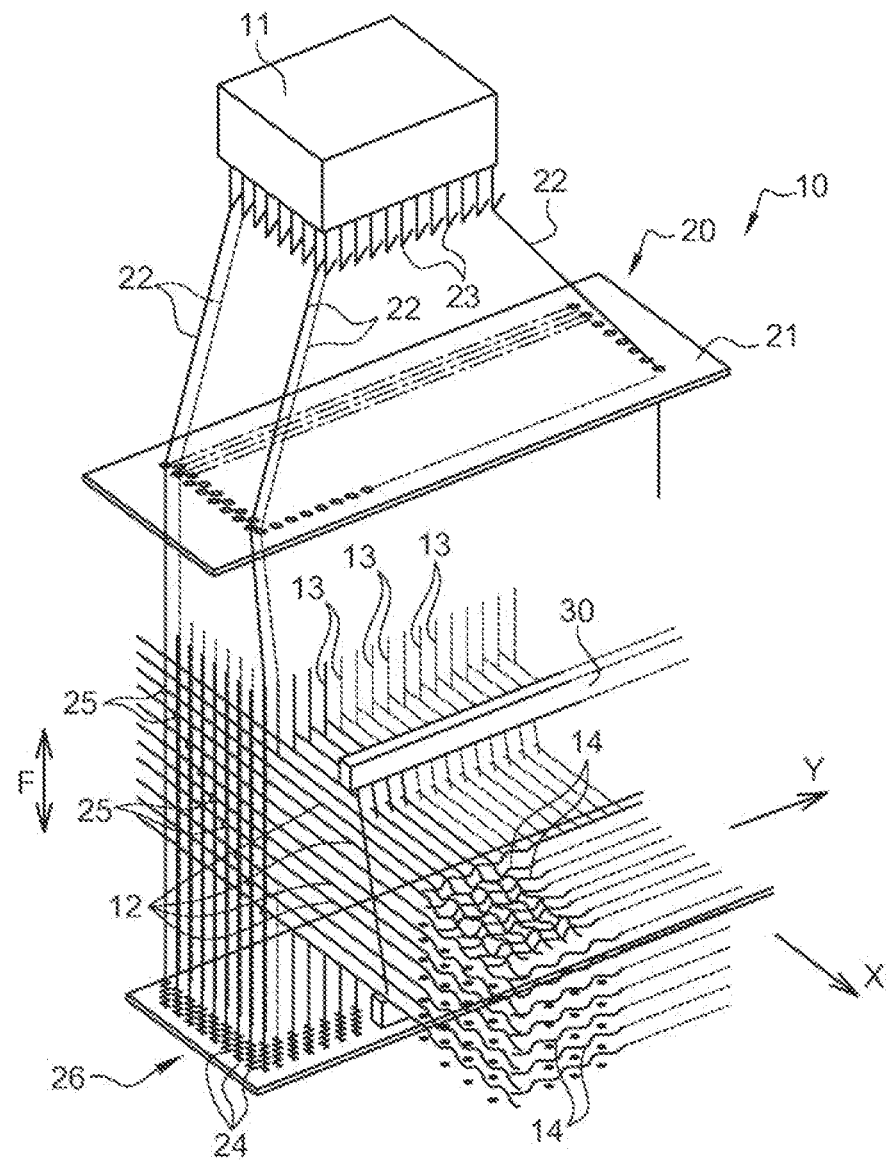
FIG. 2 is a schematic illustration of an example of a Jacquard-type loom used for the production of three-dimensional (3D) preforms.
Figure 3A:
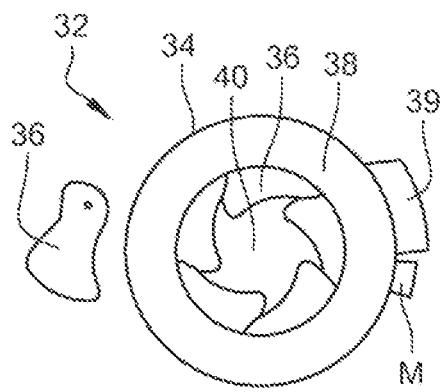
FIG. 3A is a schematic view of the device for measuring a strand diameter according to a first embodiment of the invention in the open position.
Figure 3B:
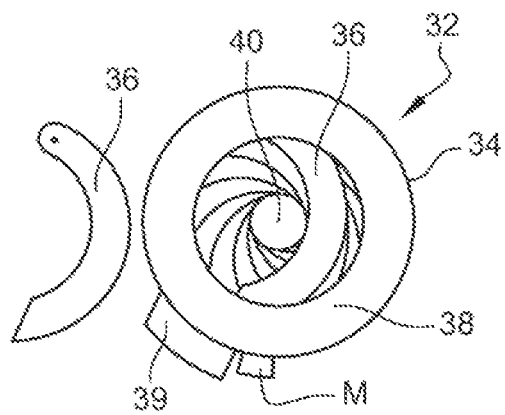
FIG. 3B is a schematic view of the device for measuring a strand diameter according to a second embodiment of the invention in the open position.
Figure 3C:
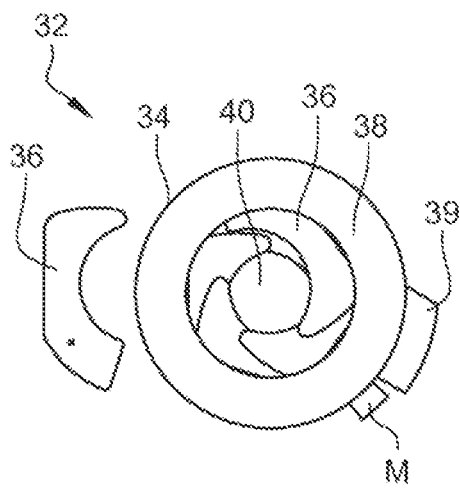
FIG. 3C is a schematic view of the device for measuring a strand diameter according to a third embodiment of the invention in the open position.
Figure 3D:
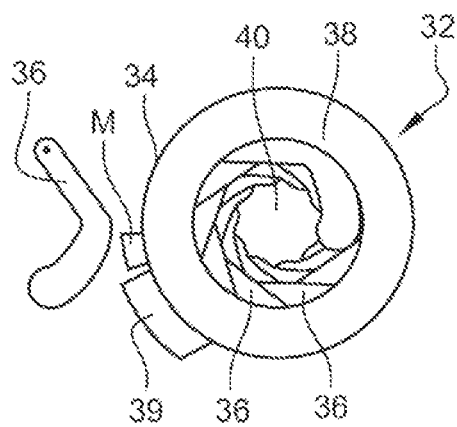
FIG. 3D is a schematic view of the device for measuring a strand diameter according to a fourth embodiment of the invention in the open position.

FIG. 2 shows a weaving installation comprising a loom 10 of the Jacquard-type 11 classically used for the realization of two-dimensional (2D) or three-dimensional (3D) preforms obtained by multilayer weaving between a plurality of layers of warp threads 12 and a plurality of layers of weft threads 13. These warp threads 12 and weft threads 13 are formed by strands 14. These warp threads 12 and weft threads 13 come from reels attached on creels C of the installation (see FIG. 1). In the particular case of the present invention, the warp threads 12 and the weft threads 13 are of different sizes according to their positioning in the preform, and thus in the different elements of the loom. It is therefore necessary to be able to check that each position is mounted with a thread of the right size, i.e. made up of the right number of filaments.

In a known way, the loom 10 is thus equipped with a Jacquard mechanism 11 supported by a superstructure not shown in FIG. 2. The loom 10 also comprises a harness 20 consisting of a comber board 21 and control threads or heddles 22, each heddle 22 being connected at one end to a control hook 23 of the Jacquard mechanism 11 and at the other end to a return spring 24 attached to the frame 26 of the loom 10.

Each heddle 22 comprises an eyelet 25 through which a warp thread 12 passes. The heddles 22 and their associated eyelets 25 are animated by a substantially vertical oscillation movement represented by the double arrow F under the tensile forces exerted respectively by the control hooks 23 and the return springs 24. The heddles 22 allow the warp threads 12 to be lifted and thus allow the introduction of weft threads 13. Specifically, each heddle 22 is individually operated and controlled, allowing each warp thread 12 to be raised or lowered. This allows achieving the spacing of the warp threads necessary for the passage of a spear that carries the weft thread 13, to weave complex patterns and to move the warp threads 12 from one layer to another, allowing the creation of a three-dimensional fibrous architecture. After each weft thread passage 13, a doffer comb 30 compacts the fabric coming out of the loom 10.

The weaving installation further comprises a device 32 for measuring the diameter of a strand 14 comprising a diaphragm 34.

FIGS. 3A to 3D show different embodiments of a device 32 each comprising a different diaphragm 34. The diaphragm 34 comprises an external ring 38 forming a support and metal strips 36 mounted on the external ring 38. The strips 36 are movably arranged inside the ring 38 and to form an iris. The strips 36 allow defining, in the centre of the iris of the diaphragm 34, an opening forming a space 40 of variable dimensions. The diaphragms 34 in FIGS. 3A to 3D are therefore iris diaphragms. This type of diaphragm allows a continuous adjustment of the strips 36 so as to allow a continuous variation of the space 40 between a full opening and a full closing of the iris. This type of diaphragm 34 is classically used in the field of the photography.

An iris diaphragm 34 is classically made up of a set of metal strips 36 whose slice describes a regular polygon. The opening or the closing of the iris diaphragm 34 is controlled by lugs (not shown) on the ring 38 of the diaphragm 34. In this way, it is possible to mechanically control the opening or the closing of the diaphragm 34 only with a control element 39 placed on the ring 38 of the diaphragm 34.

The number and the shape of strips 36 composing the iris are variable: the greater their number, the more circular the opening 18 is.

It is thus possible, by adjusting the opening of the iris (and thus the dimensions of the space 40) of the diaphragm 34, to constrain a strand 14 on its section.

As mentioned above, a strand 14 is composed of filaments and, logically, the more filaments the strand 14 comprises, the thicker it is. Thus, the dimensions of the space 40 formed in the centre of the iris of the diaphragm 34 allow determining the diameter of the strand 14 and thus to determine the number of filaments.

The strips 36 allow all the filaments to be brought together in a specific area within the space 40. The filaments forming the strand 14 are thus confined to a small area by the strips 36 of the iris. They are thus pressed together and occupy a reduced volume, encircled by the strips 36 of the iris of the diaphragm 34. By measuring the diameter of the space 40, the diameter of the strand 14 is obtained. The measured diameter corresponds to a number of filaments, the latter not being compressible.

The control element 39 of the diaphragm 34 can be a scale, allowing the reading of a dimension by an operator.

In one embodiment, the device 32 is motorized. The diaphragm 34 thus comprises a motor M connected to the control element 39.

In a manner known per se (and set forth in detail in the document FR2684460A1), the motor M activates the iris of the diaphragm 34 under the control of the control element 39, for example a microprocessor comprising a counter. The counter allows counting the number of revolutions of the motor. This allows calculating the opening surface area of the iris, thus of the space 40. The information resulting from the counter is transmitted to the control element 39, here the microprocessor. The control element 39 may comprise a memory in which a plurality of diameter reference values is stored. A comparison is then made so as to determine the exact diameter of the strand 14. The microprocessor is thus configured to determine the dimension corresponding to the dimensions of the space 40 and to keep them in memory.

In the present invention, the measuring device 32 may be positioned directly on the loom 10 at the level of the creels C. In this embodiment, the operator passes the strand 14 through a plurality of eyelets 25 to guide it to the diaphragm 34 of the device 32 and to pass it through the space 40. In the case of wefts, each position can be equipped with such a device in order to have an automated and regular measurement of the diameter of the woven weft thread, thus of the number of filaments constituting it. Thus, an operator can verify that the strand 14 inserted into the diaphragm 34 of the device 32 has the correct diameter (and thus the correct number of filaments). If the diameter is as expected, the operator can allow the weaving to start/continue.

If the closing or opening of the iris of the diaphragm 34 of the device 32 is automated/motorized, three functions can be added to the filament count measurement:

firstly, a motor torque being able to be managed, it can be used to force the strand 14 into the space 40 of the diaphragm 34 with a reproducible force. This allows in particular avoiding force variations between operators, secondly, automation allows obtaining an automatic feedback on the dimensions of the space 40 of the diaphragm 34 and to have direct access to the number of filaments of the strand 14 via the diameter measurement of the space 40 by the microprocessor. This information can then be processed directly by the loom 10 and the installation can, without requiring the intervention of an operator, authorize or not the continuation of the weaving, for example in the case of a change of a strand reel 14, the validity of the control can be recorded in a memory of the control element 39.

Thus, with each new warp, the set of the strands 14 are validated one by one by counting the number of filaments. The use of such a device 10 allows saving time on the control and to improve its reliability.

Thus, in order to determine the number of filaments making up a strand 14 by means of the weaving installation, the following steps are carried out:

attaching the measuring device 32 to a loom 10,
extending the strand 14 on the loom 10,
passing the strand 14 through the space 40 of the iris of the diaphragm 34 of the measuring device 32,
closing the device 32 around the strand 14 so as to clamp it between the strips 14 of the diaphragm 34 of the device 32,
determining the diameter of the strand 14:
  reading the dimension corresponding to the diameter of the measured strand 14,
  deducing the number of filaments forming said strand 14.

The step of determining the diameter of the strand 14 comprises the reading of the dimension indicated by the control element 39. This reading is either performed by an operator or automated.

The technical solution provided here is easy to implement and allows easily determining the number of filaments composing a given strand 14 and thus quickly knowing if said strand 14 has been attached in the right place on the loom 10.

The invention claimed is:

1. A weaving installation comprising:
a loom configured to receive a series of strands, and
at least one device adapted to measure a diameter of a strand comprising a defined number of filaments, the device comprising a diaphragm comprising an external ring forming a support on which are attached a series of strips forming an iris, the strips being movable and allowing defining, at the centre of the iris, a circular space with variable dimensions,
wherein the diaphragm is configured to adjust the dimensions of the space so as to:
  allow a strand of the loom to pass through it, and
  encircle the profile of the strand, so as to allow the number of filaments of said strand to be determined.

2. The installation according to claim 1, wherein the strips of the iris of the diaphragm occupy a first position in which the strips encircle the strand so as to compress the filaments between them in the space in a center of the iris.

3. The installation according to claim 1, wherein the device is attached to the loom.

4. The installation according to claim 1, wherein the device comprises a control element.

5. The installation according to claim 4, wherein the control element is a scale allowing a measurement of a dimension to be taken.

6. The installation according to claim 5, wherein the control element is a microprocessor and the diaphragm comprises a motor (M) connected to the microprocessor.

7. The installation according to claim 6, wherein the microprocessor is configured to determine dimension corresponding to dimensions of the space and to keep them in memory.

8. A method for determining a number of filaments in a strand by means of an installation according claim 1, the method comprising the steps of:
positioning the strand in the measuring device,
activating the device, and
determining the number of threads constituting said strand.

9. The method according to claim 8, further comprising the steps of:
opening the measuring device so that the space has a larger diameter than that of the strand, after laying said strand on the loom,
passing the strand through the space of the device,
actuating the strips of the device to close the iris around the strand so as to clamp it between the strips and to adjust the dimensions of the space to the diameter of the strand,
reading the dimension corresponding to the diameter of the measured strand, and
determining the number of filaments forming said strand.

10. The method according to claim 9, wherein the measuring device is a diaphragm and the last three steps are performed automatically.

* * * * *